United States Patent
Irie et al.

(10) Patent No.: US 8,666,653 B2
(45) Date of Patent: Mar. 4, 2014

(54) NAVIGATION SYSTEM

(75) Inventors: Takashi Irie, Tokyo (JP); Kumi Nishibashi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 409 days.

(21) Appl. No.: 13/062,817

(22) PCT Filed: Nov. 19, 2009

(86) PCT No.: PCT/JP2009/006233
§ 371 (c)(1),
(2), (4) Date: Mar. 8, 2011

(87) PCT Pub. No.: WO2010/061553
PCT Pub. Date: Jun. 3, 2010

(65) Prior Publication Data
US 2011/0166781 A1 Jul. 7, 2011

(30) Foreign Application Priority Data
Nov. 28, 2008 (JP) ................................. 2008-304964

(51) Int. Cl.
*G01C 21/36* (2006.01)

(52) U.S. Cl.
USPC ........................... 701/411; 701/414; 701/468

(58) Field of Classification Search
USPC ......... 701/408–414, 423, 424, 425, 462, 468, 701/469
See application file for complete search history.

(56) References Cited

U.S. PATENT DOCUMENTS

| 8,024,115 | B2* | 9/2011 | Hayashida et al. ........... 701/414 |
| 2001/0014846 | A1 | 8/2001 | Sawamoto et al. |
| 2001/0021895 | A1 | 9/2001 | Yamazaki |
| 2007/0050134 | A1 | 3/2007 | Hayashida et al. |
| 2008/0021638 | A1 | 1/2008 | Kobayashi |
| 2009/0248294 | A1 | 10/2009 | Machino |
| 2010/0070164 | A1 | 3/2010 | Machino |

FOREIGN PATENT DOCUMENTS

| DE | 69801725 T2 | 5/2002 |
| DE | 11 2007 002 388 B4 | 4/2012 |
| JP | 5-173481 A | 7/1993 |
| JP | 11-271075 A | 10/1999 |
| JP | 2001-183159 A | 7/2001 |
| JP | 2005-4442 A | 1/2005 |
| JP | 2005-221427 A | 8/2005 |
| JP | 2006-260517 A | 9/2006 |
| JP | 2007-86052 A | 4/2007 |
| JP | 2007-232516 A | 9/2007 |
| JP | 2008-26032 A | 2/2008 |
| JP | 2008-139104 A | 6/2008 |
| WO | WO 2008/068949 A1 | 6/2008 |

* cited by examiner

Primary Examiner — Richard Camby
(74) Attorney, Agent, or Firm — Birch, Stewart, Kolasch & Birch, LLP

(57) ABSTRACT

A navigation system has a current position detecting unit 32 for detecting a current position, a map data acquiring unit 31 for acquiring map data including road data representing an HOV lane and an ordinary lane in a single link; a driving link decision unit 38 for identifying a link of driving from the current position information indicating the current position detected by the current position detecting unit 32 and from the road data included in the map data acquired by the map data acquiring unit 31, and for outputting as a driving link; and a driving lane decision unit 39 for making a decision as to whether the driving lane is the HOV lane or ordinary lane from the driving link identified by the driving link decision unit 38.

18 Claims, 9 Drawing Sheets

FIG.3
(a) Road Image
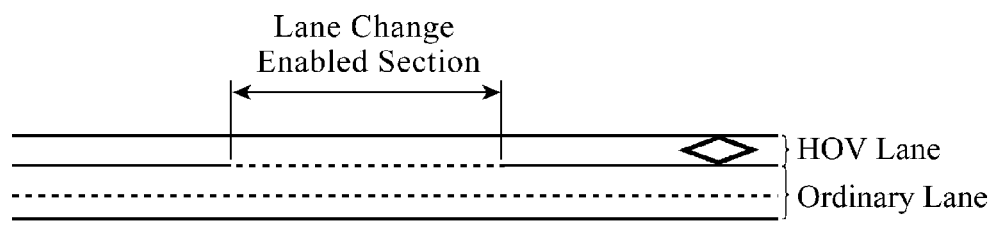
(b) Link Image Representing HOV/Ordinary Lanes as Separate Links
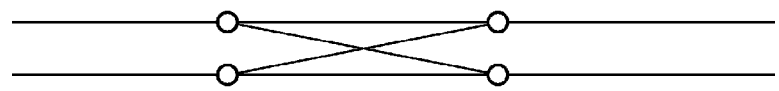
(c) Link Image Representing HOV/Ordinary Lanes in Single Link
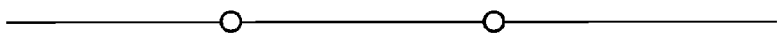

FIG.4
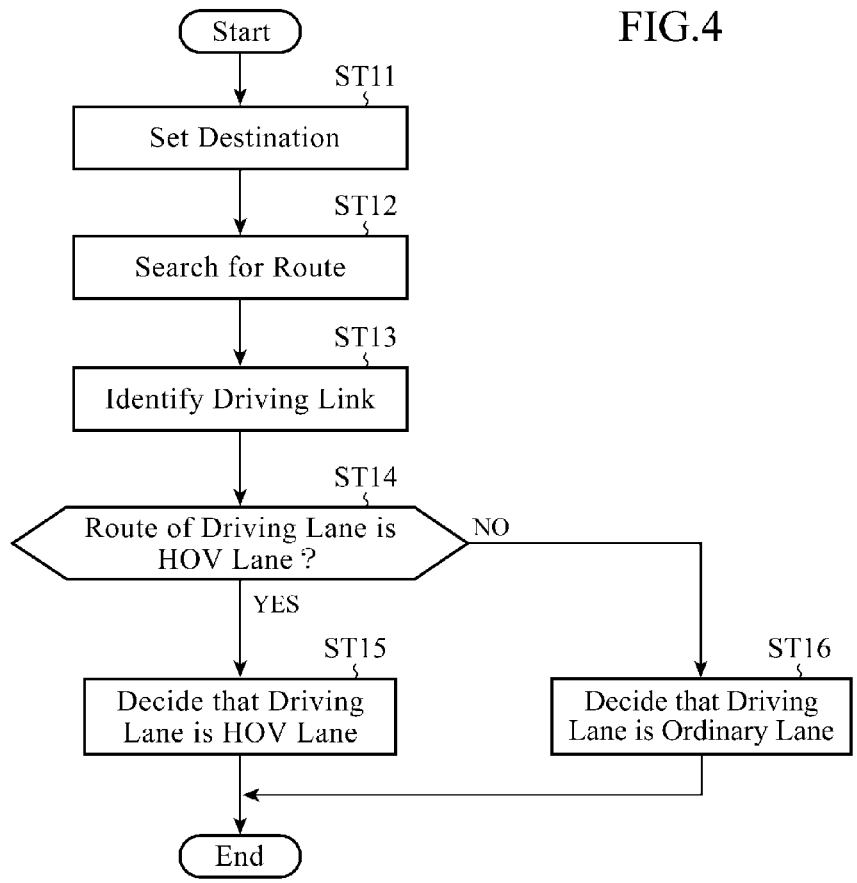
(a) Road Image
FIG.5
(b) Link Image
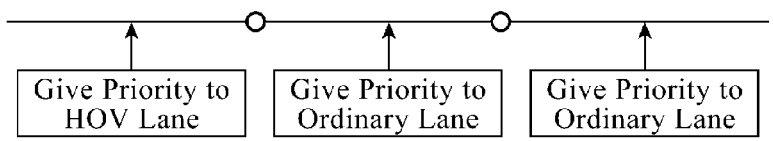

FIG.7
(a) Road Image
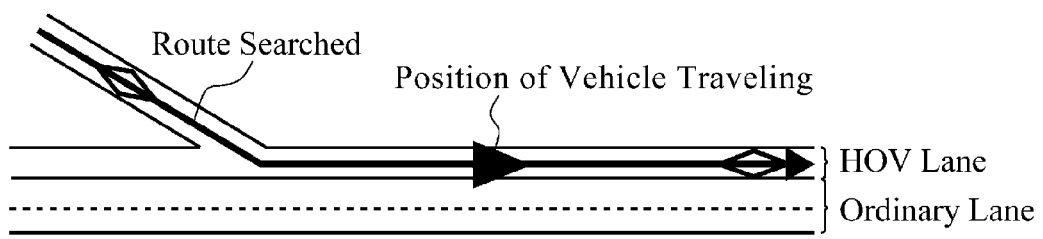
(b) Link Image
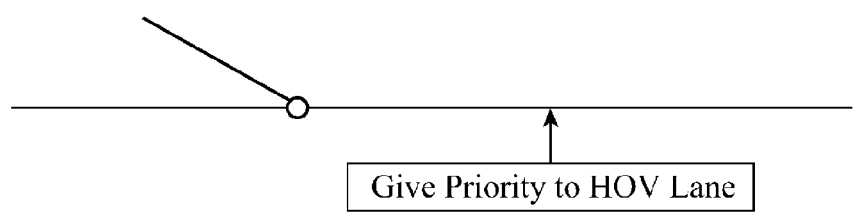

NAVIGATION SYSTEM

TECHNICAL FIELD

The present invention relates to a navigation system for guiding a user to his or her destination, and particularly to a technique for guiding taking an HOV lane (High Occupancy Vehicle Lane) into account.

BACKGROUND ART

Conventionally, as a road that regulates entrance of vehicles, a carpool lane has been known which is employed by a road system mainly seen in large cities in North America. The carpool lane, which is also called an HOV lane, is a lane that allows only vehicles with two or more passengers to travel. As an example of the carpool lane, a lane provided on a highway, a lane that short-cuts an interchange and the like are known. A road system that employs the carpool lane encourages a plurality of persons to get on the same vehicle by giving them preferential treatment that they can arrive at a destination in a shorter time by driving along the carpool lane, thereby trying to reduce a volume of traffic to alleviate traffic congestion.

As a technique for guiding along the carpool lane, Patent Document 1 discloses a navigation system that enables driving along a lane efficiently which limits changing to or from other lanes. The navigation system reads from a DVD map data containing road information on an entrance/exit point on an express highway provided with a carpool lane, and stores in a data buffer. Using the map data stored in the data buffer, a route search processing unit performs route search processing considering whether the carpool lane can be used. To carry out route guidance using the carpool lane, a carpool lane guiding unit gives prescribed lane change information using images and voices at timing when an entrance/exit point at which the route is to be changed comes within a prescribed distance from the position of the vehicle.

PRIOR ART DOCUMENT

Patent Document

Patent Document 1: Japanese Patent Laid-Open No. 2001-183159.

DISCLOSURE OF THE INVENTION

On conventional map data, even if the HOV lane and ordinary lane are set on the same road, they are shown as separate links. Accordingly, the navigation system makes a decision in which lane its own vehicle travels, the HOV lane or ordinary lane, from which link the vehicle matches to.

However, in recent map data, when the HOV lane and ordinary lane are set on the same road, they are arranged in such a manner that the road is shown by a single link. As a result, the lane change between the HOV lane and ordinary lane is enabled only in a particular section. Thus, unless a decision is made in which lane the vehicle is running correctly, a problem arises in that appropriate route search and route guidance cannot be achieved.

The present invention is implemented to solve the foregoing problems. Therefore it is an object of the present invention to provide a navigation system capable of identifying the lane where the vehicle is running correctly even if the HOV lane and ordinary lane on the same road is shown by a single link.

To solve the foregoing problem, a navigation system in accordance with the present invention has a current position detecting unit for detecting a current position; a map data acquiring unit for acquiring map data including road data representing an HOV lane and an ordinary lane in a single link; a driving link decision unit for identifying a link of driving from current position information indicating the current position detected by the current position detecting unit and from the road data included in the map data acquired by the map data acquiring unit, and for outputting as a driving link; and a driving lane decision unit for making a decision as to whether a driving lane is an HOV lane or an ordinary lane from the driving link identified by the driving link decision unit.

According to the navigation system in accordance with the present invention, even from the map data that shows the HOV lane and ordinary lane in a single link, the navigation system can decide in which lane the vehicle is traveling. Accordingly, it can conduct route search and route guidance taking the HOV lane into account. In addition, since it decides the driving lane using the route data obtained by the route search on the assumption that the user is driving along the route, it can increase the degree of matching between the actual driving lane and the driving lane recognized by the navigation system. Thus, it can offer consistent operation as the navigation system.

BRIEF DESCRIPTION OF THE DRAWINGS

FIG. 3 is a diagram showing relationships between a road and a link to be processed by the navigation system of the embodiment 1 in accordance with the present invention;

FIG. 4 is a flowchart showing the operation of the navigation system of the embodiment 1 in accordance with the present invention;

FIG. 5 is a diagram showing the operation of navigation system of the embodiment 1 in accordance with the present invention;

FIG. 7 is a diagram showing the operation of the navigation system of the embodiment 2 in accordance with the present invention;

BEST MODE FOR CARRYING OUT THE INVENTION

The best mode for carrying out the invention will now be described in detail with reference to the accompanying drawings.

Embodiment 1

Figure 1:
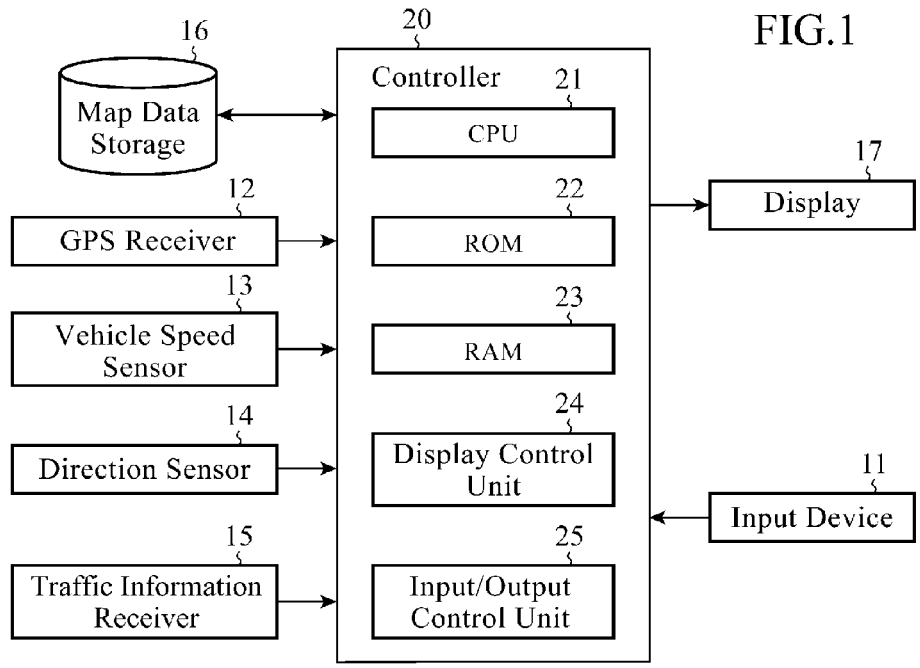
FIG. 1 is a block diagram showing a hardware configuration of a navigation system of an embodiment 1 in accordance with the present invention.

FIG. 1 is a block diagram showing a hardware configuration of a navigation system of an embodiment 1 in accordance with the present invention. The navigation system includes an input device 11, a GPS (Global Positioning System) receiver 12, a vehicle speed sensor 13, a direction sensor 14, a traffic information receiver 15, a map data storage 16, a display 17 and a controller 20.

The input device 11 comprises a touch panel mounted on a screen of a display 17, for example. The input device 11 is used for inputting a starting place for a route search, a destination or places passed through, or for a user to provide the navigation system with a variety of instructions. The information input from the input device 11 is delivered to the controller 20 as an operating signal.

The GPS receiver 12 detects the current position of the vehicle from GPS signals received from GPS satellites. The current position of the vehicle detected by the GPS receiver 12 is delivered to the controller 20 as a current position signal. The vehicle speed sensor 13 detects the moving speed of the vehicle. The moving speed of the vehicle detected with the speed sensor 13 is delivered to the controller 20 as a speed signal. The direction sensor 14 detects the direction in which the vehicle faces. The direction detected with the direction sensor 14 is delivered to the controller 20 as a direction signal.

The traffic information receiver 15 receives a traffic information signal a teleterminal of the Vehicle Information and Communication System (VICS (registered trademark)) sends, for example. Incidentally, as the traffic information receiver 15, a TMC (Traffic Message Channel) receiver can be used. The traffic information signal received by the traffic information receiver 15 is delivered to the controller 20.

The map data storage 16, which is constructed of an HDD (Hard Disk Drive) system, for example, stores not only digitized map data containing road data defining roads with links and nodes, but also various data for achieving navigation functions. Incidentally, the map data storage 16 can be constructed not only of the HDD, but also of a drive unit for reading data from a DVD (Digital Versatile Disk) or CD (Compact Disk) loaded.

A road represented by road data contained in the map data is defined by a single link regardless of whether an HOV lane is juxtaposed or not. FIG. 3 is a diagram showing relationships between the road and link. FIG. 3 (*a*) shows a road image including an HOV lane and an ordinary lane (lane other than the HOV lane). FIG. 3 (*b*) is a diagram showing a conventional link image defining the HOV lane and ordinary lane as separate links; and FIG. 3 (*c*) is a diagram showing a link image defining the HOV lane and ordinary lane as a single link.

Each link includes lane information, speed limit information and the like. The lane information includes HOV lane position information indicating the position of the HOV lane, HOV lane presence/absence information indicating whether the HOV lane is juxtaposed or not, lane change enabled section information indicating sections in which lane changes are allowed between the HOV lane and another lane, regulation time information indicating a passable/impassable time zone at an HOV lane gate, a road name and a road number. The data stored in the map data storage 16 is read by the controller 20.

The display 17, which is composed of an LCD (Liquid Crystal Display), for example, displays a map, a route, an information map and various guiding messages in accordance with a video signal delivered from the controller 20.

The controller 20 controls the navigation system in its entirety. The controller 20 has in terms of hardware a CPU (Central Processing Unit) 21, a ROM (Read Only Memory) 22, a RAM (Random Access Memory) 23, a display control unit 24 and an input/output control unit 25.

The CPU 21, using the RAM 23 as a working memory, executes the route search or route guidance by operating according to programs read out of the ROM 22. The ROM 22 stores programs and data that are read by the CPU 21 for executing various steps. The RAM 23, which is used as the working memory of the CPU 21 as mentioned above, temporarily stores data during processing (such as developed map data).

The display control unit 24 controls the display 17. More specifically, the display control unit 24 converts the display data created by the CPU 21 to the video signal, and delivers it to the display 17 via an input/output control unit 25. The input/output control unit 25, which functions as an interface between the controller 20 and the devices connected to it, that is, the input device 11, GPS receiver 12, vehicle speed sensor 13, direction sensor 14, traffic information receiver 15, map data storage 16 and display 17, controls transfer of signals between them.

Figure 2:
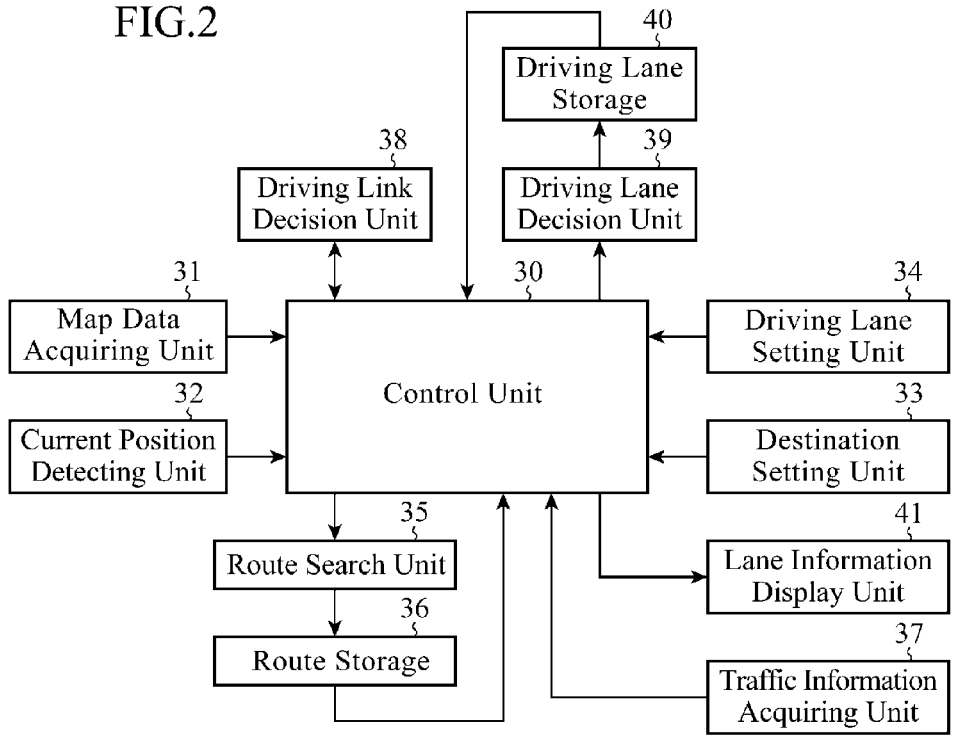
FIG. 2 is a functional block diagram showing a functional configuration of a controller of the navigation system of the embodiment 1 in accordance with the present invention.

Next, functions achieved by the controller 20 will be described in detail. FIG. 2 is a functional block diagram showing a functional configuration of the controller 20. The controller 20 includes a control unit 30, a map data acquiring unit 31, a current position detecting unit 32, a destination setting unit 33, a driving lane setting unit 34, a route search unit 35, a route storage 36, a traffic information acquiring unit 37, a driving link decision unit 38, a driving lane decision unit 39, a driving lane storage 40 and a lane information display unit 41. Among these units, those other than the route storage 36 and driving lane storage 40 are implemented by program processing executed by the CPU 21.

The control unit 30 controls the controller 20 in its entirety. For example, the control unit 30 controls starting and stopping of the components and data transfer between the components. Incidentally, although not shown in the figure, the control unit 30 is supplied with the speed signal from the vehicle speed sensor 13 and the direction signal from the direction sensor 14.

The map data acquiring unit 31 acquires the map data from the map data storage 16 and delivers to the control unit 30. The current position detecting unit 32 detects the current position of the vehicle on the map from the current position signal delivered from the GPS receiver 12, or the current position signal created by dead reckoning using the direction signal delivered from the direction sensor 14 and the speed signal delivered from the vehicle speed sensor 13, and the map data acquired from the map data acquiring unit 31 via the control unit 30. The current position detected by the current position detecting unit 32 is delivered to the control unit 30 as the current position information.

The destination setting unit 33 delivers, when the operating signal delivered from the input device 11 indicates a destination, the destination to the control unit 30. The driving lane setting unit 34 delivers the driving lane indicated by the operating signal delivered from the input device 11 to the control unit 30.

The route search unit 35 searches for a route from the current position indicated by the current position information delivered from the current position detecting unit 32 via the control unit 30 to the destination delivered from the destination setting unit 33 via the control unit 30 on the basis of the map data acquired from the map data acquiring unit 31 via the control unit 30. To the route the route search unit 35 searches for, information on whether it is a route using the HOV lane or a route using the ordinary lane is added, and they are delivered to the route storage 36 as the route data.

The route storage 36 is provided in a portion of the RAM 23 of the controller 20 to store the route data delivered from the route search unit 35. The route data stored in the route storage 36 is readby the control unit 30. The traffic information acquiring unit 37 acquires the traffic information from the traffic information receiver 15 and delivers it to the control unit 30.

The driving link decision unit 38 identifies the link the vehicle is traveling (referred to as "driving link" from now on) on the basis of the current position information delivered from the current position detecting unit 32 via the control unit 30 and the road data contained in the map data delivered from the map data acquiring unit 31 via the control unit 30. The driving link identified by the driving link decision unit 38 is delivered to the control unit 30.

The driving lane decision unit 39 decides whether the lane in which the vehicle is traveling (referred to as "driving lane" from now on) is the HOV lane or ordinary lane by deciding whether the route including the driving link delivered from the driving link decision unit 38 via the control unit 30 is a route passing through the HOV lane or through the ordinary lane on the basis of the route data read from the route storage 36 via the control unit 30. The decision result of the driving lane decision unit 39 is delivered to the driving lane storage 40 as driving lane data.

The driving lane storage 40, which is provided in a portion of the RAM 23 of the controller 20, stores the driving lane data delivered from the driving lane decision unit 39. The driving lane data stored in the driving lane storage 40 is read by the control unit 30.

The lane information display unit 41 creates the display data for displaying the information associated with the lane from the lane information delivered from the control unit 30, and delivers to the display control unit 24 in the controller 20. Thus, the display 17 displays the information associated with the lane.

Next, the operation of the navigation system of the embodiment 1 in accordance with the present invention with the foregoing configuration will be described with reference to the flowchart shown in FIG. 4 centering on the driving lane decision processing of deciding whether the driving lane is to be an HOV lane or ordinary lane.

In the driving lane decision processing, a destination is set first (step ST11). More specifically, the route search unit 35 acquires the destination from the destination setting unit 33 via the control unit 30. Subsequently, the route search is conducted (step ST12). More specifically, the route search unit 35 searches for the route from the current position indicated by the current position information delivered from the current position detecting unit 32 via the control unit 30 to the destination acquired at step ST11 from the map data acquired from the map data acquiring unit 31 via the control unit 30. To the route data indicating the route acquired by the search, the information on whether it is the route using the HOV lane or the route using the ordinary lane is added, and then they are delivered to the route storage 36 to be stored.

Subsequently, the driving link is identified (step ST13). More specifically, the driving link decision unit 38 identifies the driving link from the current position information delivered from the current position detecting unit 32 via the control unit 30 and the road data contained in the map data acquired from the map data acquiring unit 31 via the control unit 30.

Subsequently, the route of the driving link is checked whether it is an HOV lane or not (step ST14). More specifically, the driving lane decision unit 39 refers to the route data read from the route storage 36, and checks whether the route contained in the driving link identified at step ST13 is a route passing through the HOV lane or ordinary lane.

If a decision is made at step ST14 that the route of the driving link is an HOV lane, a decision is made that the lane in which the vehicle is traveling is the HOV lane (step ST15), followed by terminating the driving lane decision processing. On the other hand, unless a decision is made at step ST14 that the route of the driving link is an HOV lane, a decision is made that the lane in which the vehicle is traveling is an ordinary lane (step ST16). After that, the driving lane decision processing is closed.

The decision result of the driving lane decision unit 39 obtained by the foregoing processing, that is, whether the current driving link is an HOV lane or ordinary lane is used for displaying whether the driving road is the HOV lane or not on a map. In addition, it is used for at least one of the route search, route guidance and map matching that matches the current position to a road on the map.

As described above, according to the navigation system of the embodiment 1 in accordance with the present invention, it offers the following advantages. More specifically, regardless of whether the vehicle is traveling in the HOV lane or ordinary lane, the conventional navigation system can only recognize that the vehicle is traveling on the link corresponding to that driving lane. In contrast with this, according to the navigation system of the embodiment 1, even from the map data that shows the HOV lane and ordinary lane in a single link, the navigation system can decide in which lane the vehicle is traveling, thereby enabling route search and route guidance considering the HOV lane.

In addition, as for the map data that shows the HOV lane and ordinary lane in a single link, although it is difficult to identify the position of the driving lane from the current position detected by the current position detecting unit 32, according to the navigation system of the embodiment 1, it can increase the degree of matching between the actual driving lane and the driving lane recognized by the navigation system by deciding the driving lane using the route data obtained by the route search as shown in FIG. 5 on the assumption that the user is driving along the route. In addition, it can offer consistent operation as the navigation system.

Incidentally, according to the navigation system of the embodiment 1 described above, although it is configured in such a manner that the driving lane decision unit 39 decides whether the route containing the driving link identified by the driving link decision unit 38 is a route passing through the HOV lane or ordinary lane by referring to the route data read from the route storage 36, a configuration is also possible which decides whether the lane in which the vehicle is traveling is the HOV lane or ordinary lane only from the driving link identified by the driving link decision unit 38 without referring to the route data.

Embodiment 2

A navigation system of an embodiment 2 in accordance with the present invention has the same configuration as the navigation system of the embodiment 1 described above. In the following, differences (in operation) from the navigation system of the embodiment 1 will be described mainly.

Figure 6:
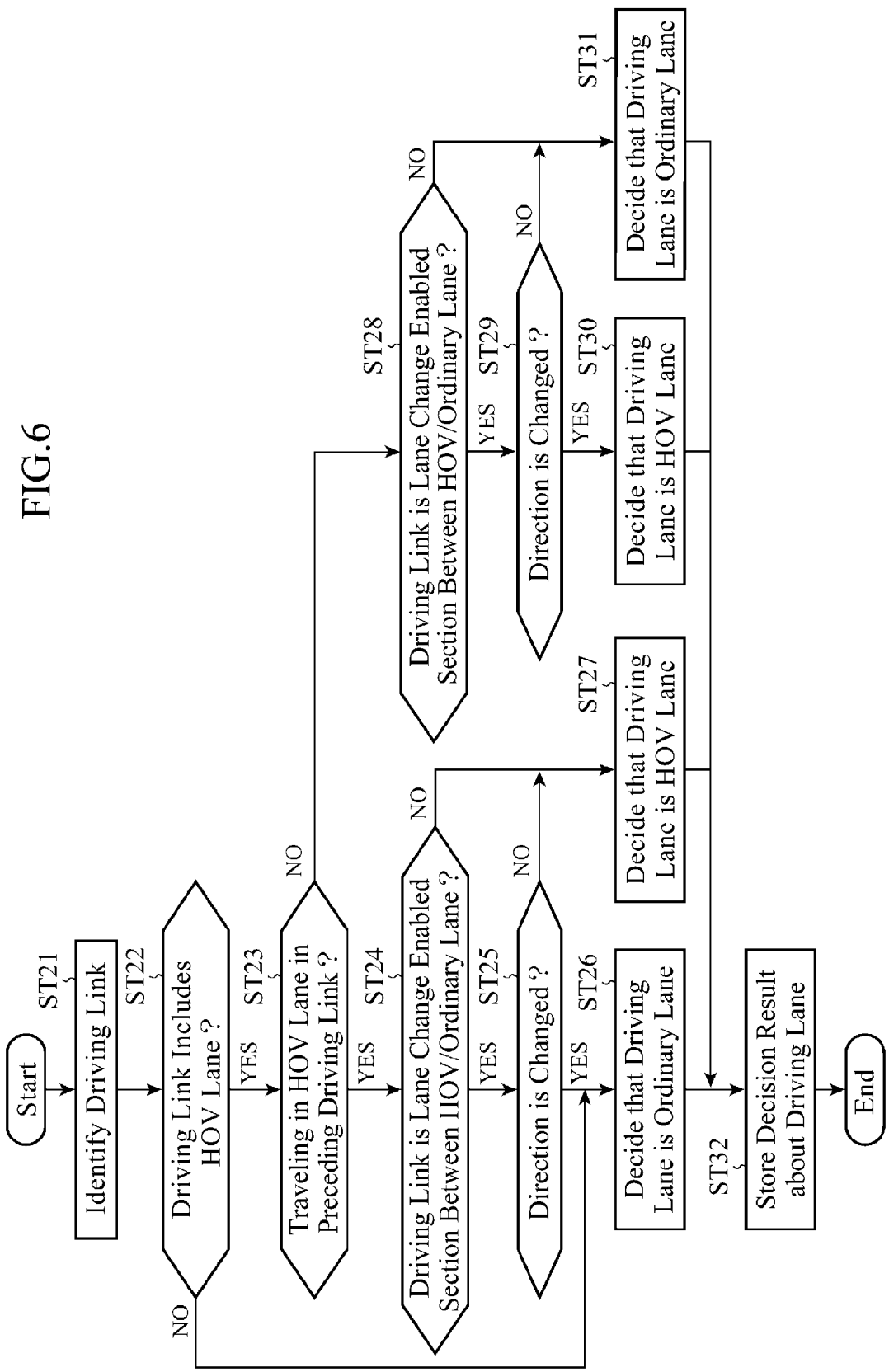
FIG. 6 is a flowchart showing the operation of a navigation system of an embodiment 2 in accordance with the present invention.

FIG. 6 is a flowchart showing the operation of the navigation system of the embodiment 2 centering on the driving lane decision processing. The driving lane decision processing identifies the driving link, first (step ST21). The processing at step ST21 is the same as the processing at step ST13 of FIG. 4 described above.

Subsequently, the driving link is checked whether it includes an HOV lane or not (step ST22). More specifically, the driving lane decision unit 39 checks whether the driving link identified at step ST21 contains an HOV lane or not by referring to the HOV lane presence/absence information constituting the lane information of the road data contained in the map data acquired from the map data acquiring unit 31 via the control unit 30. If a decision is made at step ST22 that the driving link does not contain the HOV lane, a sequence proceeds to step ST26.

On the other hand, if a decision is made at step ST22 that the driving link contains the HOV lane, then the preceding driving link is checked whether the vehicle was traveling in the HOV lane or not (step ST23). More specifically, the driving lane decision unit 39 acquires the driving lane data during driving in the preceding link from the past driving lane data acquired from the driving lane storage 40 via the control unit 30, and checks whether the vehicle was traveling in the HOV lane or ordinary lane.

If a decision is made at step ST23 that the vehicle was traveling in the HOV lane in the preceding driving link, then the driving link is checked whether it is a lane change enabled section between the HOV lane and ordinary lane (step ST24). More specifically, the driving lane decision unit 39 checks whether the driving link identified at step ST21 is the lane change enabled section between the HOV lane and ordinary lane or not by referring to the lane change enabled section information constituting the lane information in the road data contained in the map data acquired from the map data acquiring unit 31 via the control unit 30.

If a decision is made step ST24 that the driving link is the lane change enabled section between the HOV lane and ordinary lane, then the direction of the vehicle is checked whether it is changed or not (step ST25). More specifically, the driving lane decision unit 39 checks whether the direction signal delivered from the direction sensor 14 via the control unit 30 changes or not. If a decision is made at step ST25 that the direction of the vehicle changes, the sequence proceeds to step ST26.

At step ST26, a decision is made that the driving lane is an ordinary lane. More specifically, unless a decision is made at step ST22 that the driving link includes the HOV lane, the driving lane decision unit 39 decides unconditionally that the current driving lane is the ordinary lane. In addition, if a decision is made at step ST25 that the direction of the vehicle changes, it recognizes that the vehicle changes its direction in the lane change enabled section to switch the lane from the HOV lane in which it previously drives to the ordinary lane, and decides that the current driving lane is the ordinary lane.

Subsequently, the decision result of the driving lane is stored (step ST32). More specifically, the driving lane decision unit 39 stores the decision result into the driving lane storage 40, followed by terminating the driving lane decision processing.

Unless a decision is made at the foregoing step ST24 that the driving link is the lane change enabled section between the HOV lane and ordinary lane, or unless a decision is made at step ST25 that the direction of the vehicle changes, the driving lane is decided as the HOV lane (step ST27). More specifically, unless the driving link is the lane change enabled section or unless the direction of the vehicle changes in the lane change enabled section, the driving lane decision unit 39 recognizes that the vehicle continues traveling in the preceding HOV lane, and decides that the current driving lane is the HOV lane. After that, the sequence proceeds to step ST32 to store the decision result of the driving lane.

Unless a decision is made at the foregoing step ST23 that the vehicle traveled in the HOV lane in the preceding driving link, then the driving link is checked whether it is the lane change enabled section between the HOV lane and ordinary lane or not (step ST28). The processing at step ST28 is the same as the processing at the foregoing step ST24.

At this step ST28, if a decision is made that the driving link is the lane change enabled section between the HOV lane and ordinary lane, the direction of the vehicle is checked whether it is changed or not (step ST29). The processing at step ST29 is the same as the processing at step ST25. If a decision is made at this step ST29 that the vehicle changes its direction, a decision is made that the driving lane is the HOV lane (step ST30). More specifically, the driving lane decision unit 39 recognizes that the vehicle changes its direction in the lane change enabled section and switches the lane from the previously driving ordinary lane to the HOV lane, and decides that the current driving lane is the HOV lane. After that, the sequence proceeds to step ST32 to store the decision result of the driving lane.

Unless a decision is made at the foregoing step ST28 that the driving link is the lane change enabled section between the HOV lane and ordinary lane, or unless a decision is made at step ST29 that the vehicle changes its direction, a decision is made that the driving lane is the ordinary lane (step ST31). More specifically, unless the driving link is the lane change enabled section or unless the vehicle changes its direction in the lane change enabled section, then the driving lane decision unit 39 recognizes that the vehicle continues traveling in the previously driving ordinary lane, and decides that the current driving lane is the ordinary lane. After that, the sequence proceeds to step ST32 to store the decision result of the driving lane.

As described above, according to the navigation system of the embodiment 2 in accordance with the present invention, it decides that the current driving lane is the HOV lane if the preceding driving link is the HOV lane and unless the current driving link has a lane change enabled section between the HOV lane and ordinary lane, or unless the vehicle changes its direction in the lane change enabled section. Accordingly, it can increase the degree of matching between the actual driving lane and the driving lane recognized by the navigation system, thereby being able to offer consistent operation as the navigation system. In particular, it is effective when each link the vehicle has traveled through includes an HOV lane dedicated link as shown in FIG. 7.

Embodiment 3

A navigation system of an embodiment 3 in accordance with the present invention has the same configuration as the navigation system of the embodiment 1 described above. In the following, differences (in operation) from the navigation system of the embodiment 1 will be described mainly.

Figure 8:
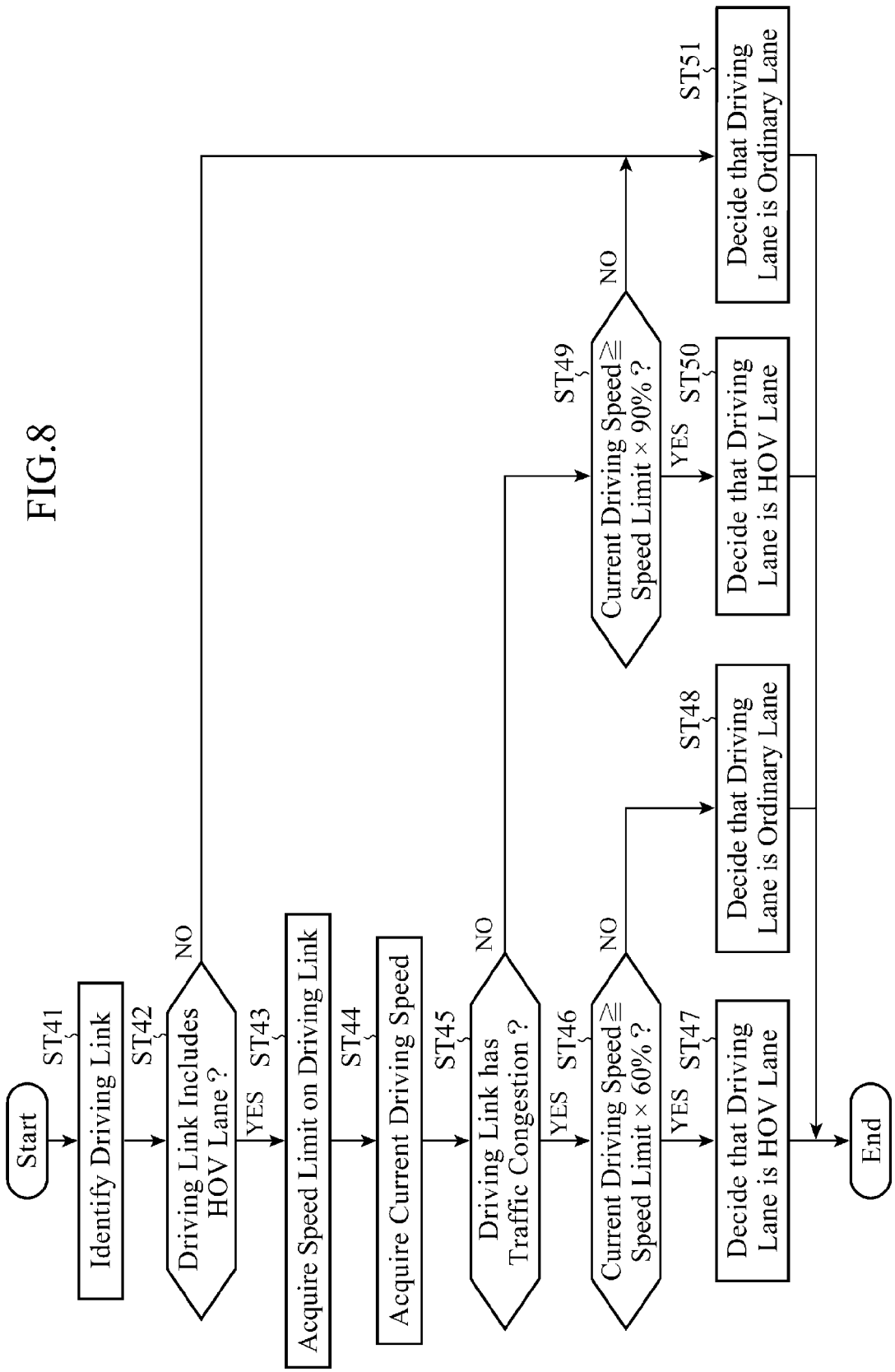
FIG. 8 is a flowchart showing the operation of a navigation system of an embodiment 3 in accordance with the present invention.

FIG. 8 is a flowchart showing the operation of the navigation system of the embodiment 3 centering on the driving lane decision processing. The driving lane decision processing identifies the driving link, first (step ST41). The processing at step ST41 is the same as the processing at step ST13 of FIG.

4 described above. Subsequently, the driving link is checked whether it includes an HOV lane or not (step ST42). The processing at step ST42 is the same as the processing at step ST22 of FIG. 6 described above.

If a decision is made at this step ST42 that the driving link includes the HOV lane, the speed limit on the driving link is acquired (step ST43). More specifically, the driving lane decision unit 39 acquires the speed limit information on the driving link identified at the foregoing step ST41 from the map data acquired from the map data acquiring unit 31 via the control unit 30.

Subsequently, the current driving speed is acquired (step ST44). More specifically, the driving lane decision unit 39 acquires the current vehicle speed indicated by the speed signal delivered from vehicle speed sensor 13 via the control unit 30.

Subsequently, the driving link is checked whether it has traffic congestion or not (step ST45). More specifically, the driving lane decision unit 39 acquires the traffic information from the traffic information acquiring unit 37 via the control unit 30, and checks whether the driving link identified at step ST41 has traffic congestion on the basis of the traffic information.

If a decision is made at this step ST45 that the driving link has traffic congestion, then the current driving speed is checked whether it is not less than 60% of the speed limit or not (step ST46). More specifically, the driving lane decision unit 39 checks whether the driving speed acquired at step ST44 is 60% or more of the speed limit acquired at step ST43 or not.

If a decision is made at this step ST46 that the current driving speed is not less than 60% of the speed limit, a decision is made that the driving lane is the HOV lane (step ST47). More specifically, the driving lane decision unit 39 recognizes that the vehicle is traveling at a comparatively high speed in spite of the traffic congestion, and decides that the current driving lane is the HOV lane. Incidentally, although a fixed value "60%" of the speed limit is used as a criterion at this step ST46, another value can be used as the fixed value. In addition, the fixed value can be changed in accordance with the degree of traffic congestion, followed by terminating the driving lane decision processing.

Unless a decision is made at the foregoing step ST46 that the current driving speed is not less than 60% of the speed limit, a decision is made that the driving lane is an ordinary lane (step ST48). More specifically, the driving lane decision unit 39 recognizes that the vehicle cannot travel at a high speed because of traffic congestion, and decides that the current driving lane is an ordinary lane, followed by terminating the driving lane decision processing.

If a decision is made at the foregoing step ST45 that the driving link has no traffic congestion, then the current driving speed is checked whether it is not less than 90% of the speed limit (step ST49). More specifically, the driving lane decision unit 39 checks whether the driving speed acquired at step ST44 is 90% or more of the speed limit acquired at step ST43.

If a decision is made at this step ST49 that the current driving speed is 90% or more of the speed limit, a decision is made that the driving lane is the HOV lane (step ST50). More specifically, recognizing that there is no traffic congestion and the vehicle is traveling at a high speed close to the speed limit, the driving lane decision unit 39 decides that the current driving lane is the HOV lane. Incidentally, although this step ST49 uses the fixed value "90%" of the control speed as the criterion, another value can be used as the criterion. After that, driving lane decision processing is closed.

Unless a decision is made at the foregoing step ST49 that the current driving speed is 90% or more of the speed limit, a decision is made that the driving lane is an ordinary lane (step ST51). More specifically, recognizing that the vehicle cannot travel at a high speed even without traffic congestion, the driving lane decision unit 39 decides that the current driving lane is the ordinary lane. After that, the driving lane decision processing is terminated.

Unless a decision is made at the foregoing step ST42 that the driving link includes the HOV lane, the sequence proceeds to step ST51 at which a decision is made that the driving lane is the ordinary lane.

As described above, according to the navigation system of the embodiment 3 in accordance with the present invention, since the speed of a vehicle traveling in an HOV lane is generally faster than a vehicle traveling in an ordinary lane, considering the driving speed makes it possible to increase the degree of matching between the actual driving lane and the driving lane recognized by the navigation system.

In addition, even if the road has traffic congestion, since the HOV lane is not crowded generally, taking account of the traffic information when considering the driving speed makes it possible to increase the degree of matching between the actual driving lane and the driving lane recognized by the navigation system.

Embodiment 4

A navigation system of an embodiment 4 in accordance with the present invention has the same configuration as the navigation system of the embodiment 1 described above. In the following, differences (in operation) from the navigation system of the embodiment 1 will be described mainly.

Figure 9:
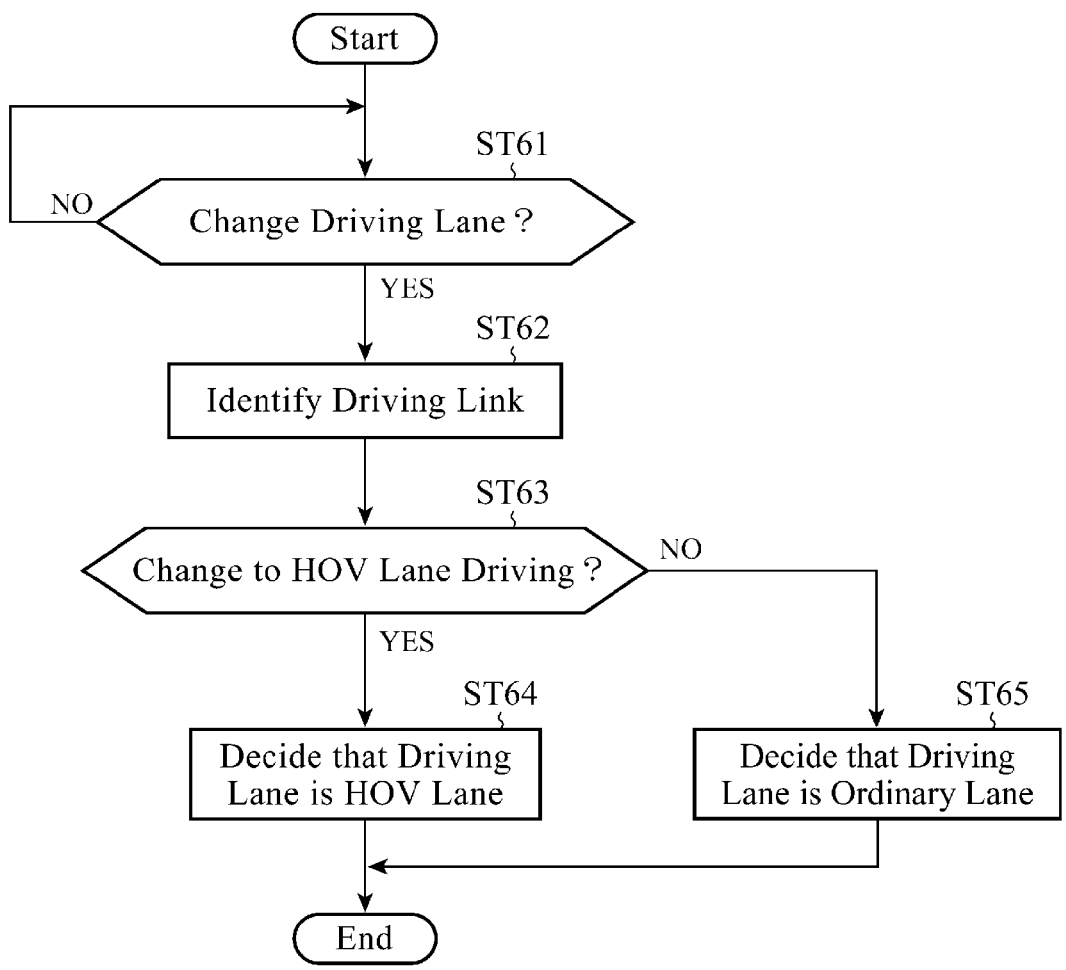
FIG. 9 is a flowchart showing the operation of a navigation system of an embodiment 4 in accordance with the present invention.

FIG. 9 is a flowchart showing the operation of the navigation system of the embodiment 4 centering on the driving lane decision processing. The driving lane decision processing checks whether the driving lane is switched or not, first (step ST61). More specifically, the driving lane decision unit 39 checks whether the driving lane delivered from the driving lane setting unit 34 via the control unit 30 is a lane that requires switching of the current driving lane. If a decision is made at this step ST61 that the driving lane is not switched, it enters a standby mode while executing this step ST61 repeatedly.

If a decision is made that the driving lane is switched in the standby mode while executing this step ST61 repeatedly, then the driving link is identified (step ST62). The processing at this step ST62 is the same as the processing at step ST13 in FIG. 4 described above.

Subsequently, switching to the HOV lane driving is checked (step ST63). More specifically, the driving lane decision unit 39 checks whether the driving lane delivered from driving lane setting unit 34 via the control unit 30 indicates an HOV lane or not.

If a decision is made at this step ST63 that switching to the HOV lane takes place, a decision is made that the driving lane is the HOV lane (step ST64), followed by terminating the driving lane decision processing. On the other hand, unless a decision is made at step ST63 that the switching to an HOV lane takes place, a decision is made that the driving lane is an ordinary lane (step ST65), followed by terminating the driving lane decision processing.

As described above, according to the navigation system of the embodiment 4 in accordance with the present invention, even if the navigation system fails in deciding the driving lane in which the vehicle is traveling, the user can set the driving lane to the HOV lane or ordinary lane freely, thereby being able to enable correct route search and route guidance.

Embodiment 5

A navigation system of an embodiment 5 in accordance with the present invention has the same configuration as the navigation system of the embodiment 1 described above. In the following, differences (in operation) from the navigation system of the embodiment 1 will be described mainly.

Figure 10:
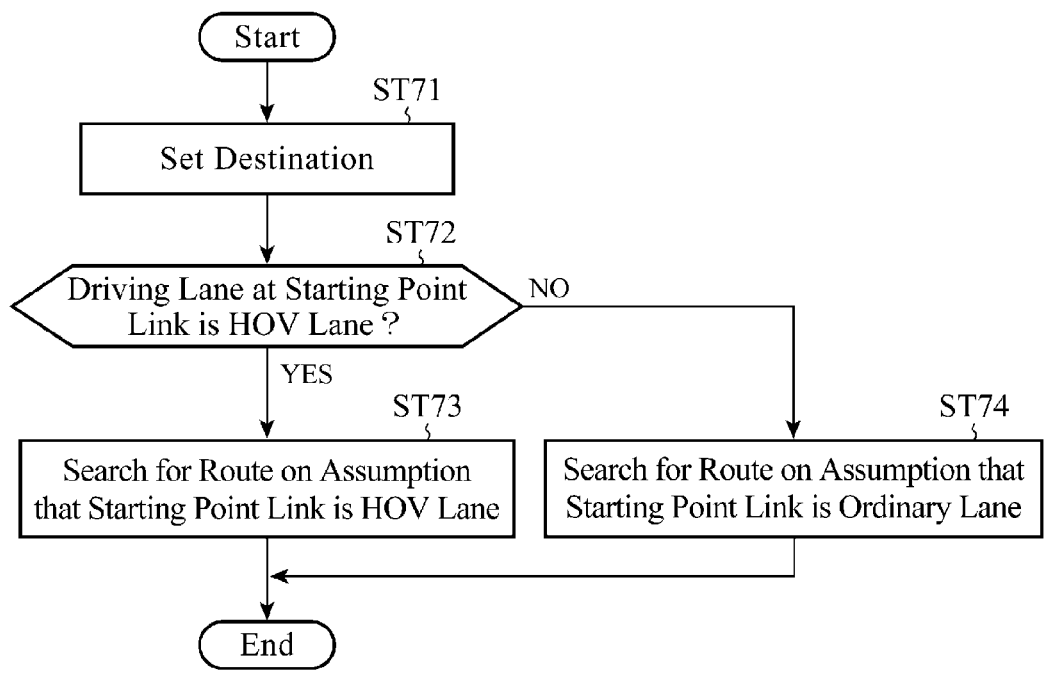
FIG. 10 is a flowchart showing the operation of a navigation system of an embodiment 5 in accordance with the present invention.

FIG. 10 is a flowchart showing the operation of the navigation system of the embodiment 5 centering on the route search processing. The route search processing sets a destination, first (step ST71). More specifically, the destination setting unit 33 delivers the destination designated by the operating signal delivered from the input device 11 to the route search unit 35. Subsequently, the driving lane of a starting link is checked whether it is an HOV lane or not (step ST72). More specifically, the driving lane decision unit 39 checks whether the driving lane of the link (starting link) in which the vehicle is when the destination is set at step ST71 is the HOV lane or not.

If a decision is made at this step ST72 that the driving lane of the starting link is the HOV lane, a route search is made on the assumption that the starting link is the HOV lane (step ST73). More specifically, the route search unit 35, assuming that the starting link is the HOV lane, searches for a route from the starting place (the current position detected by the current position detecting unit 32) to the destination. After that, the route search processing is terminated.

On the other hand, unless a decision is made at step ST72 that the driving lane of the starting link is an HOV lane, a route search is made on the assumption that the starting link is an ordinary lane (step ST74). More specifically, the route search unit 35, assuming that the starting link is an ordinary lane, searches for a route from the starting place (the current position detected by the current position detecting unit 32) to the destination. After that, the route search processing is terminated.

Figure 11:
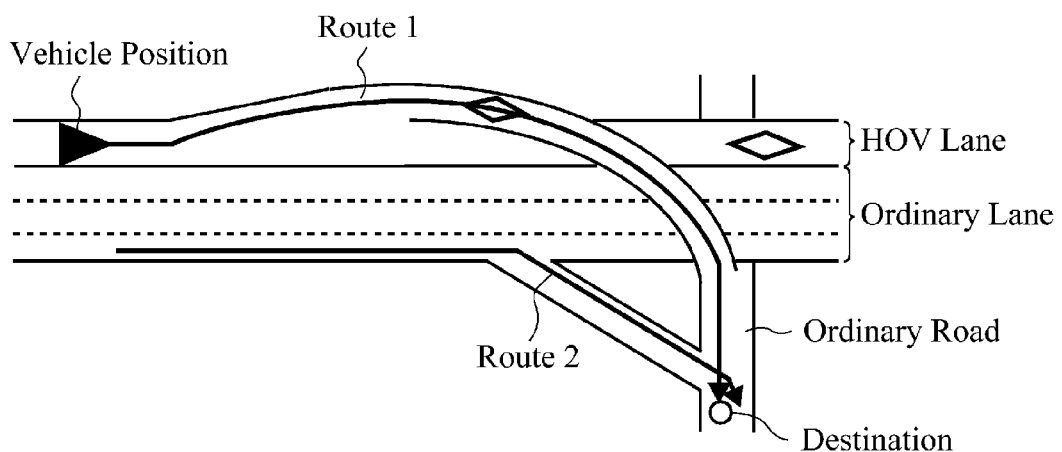
FIG. 11 is a diagram showing the operation of the navigation system of the embodiment 5 in accordance with the present invention.

As described above, according to the navigation system of the embodiment 5 in accordance with the present invention, the following advantages are achieved. More specifically, as for the lane change between the HOV lane and ordinary lane, since a lot of roads allow it in only particular sections, unless considering whether the lane at the starting place is an HOV lane or ordinary lane in a route search, there can be some cases of finding a route in which the user cannot drive. In contrast with this, according to the navigation system of the embodiment 5, since the route search is carried out considering whether the lane at the starting place is the HOV lane or ordinary lane, such a problem can be solved. For example, in the example shown in FIG. 11, if a decision is made that the driving lane of the vehicle at the route search is the HOV lane, a route 1 rather than a route 2 is searched for.

Embodiment 6

A navigation system of an embodiment 6 in accordance with the present invention has the same configuration as the navigation system of the embodiment 1 described above. In the following, differences (in operation) from the navigation system of the embodiment 1 will be described mainly.

Figure 12:
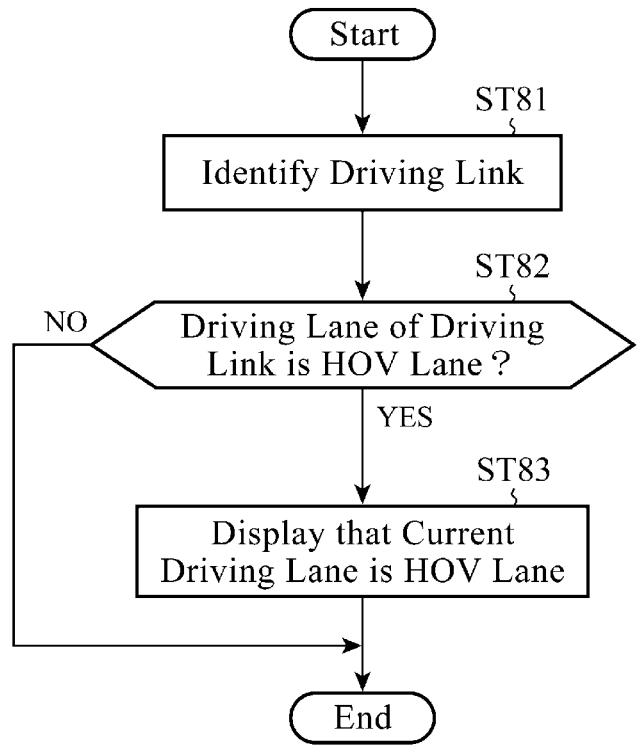
FIG. 12 is a flowchart showing the operation of a navigation system of an embodiment 6 in accordance with the present invention.

FIG. 12 is a flowchart showing the operation of the navigation system of the embodiment 6 centering on display guide processing. In the display guide processing, the driving link is identified, first (step ST81). The processing at this step ST81 is the same as the processing at step ST13 of FIG. 4 described above. Subsequently, the driving lane of the driving link is checked whether it is an HOV lane or not (step ST82). More specifically, the driving lane decision unit 39 checks whether the driving lane in which the vehicle is traveling is the HOV lane or not. If a decision is made at this step ST82 that the driving lane of the driving link is not the HOV lane but an ordinary lane, the display guide processing is terminated.

Figure 13:
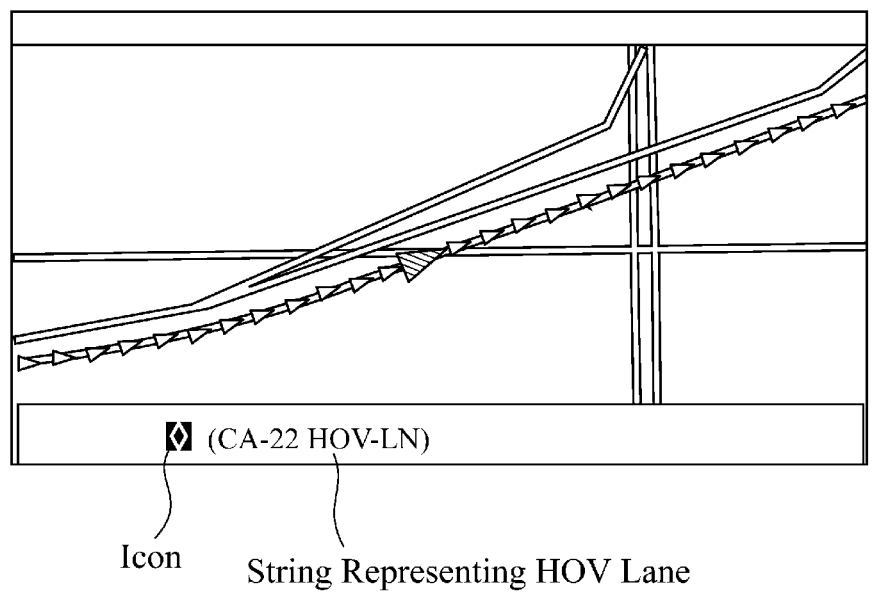
FIG. 13 is a diagram showing a display example of an HOV lane shown on the navigation system of the embodiment 6 in accordance with the present invention.

On the other hand, if a decision is made at step ST82 that the driving lane of the driving link is the HOV lane, display showing that the current driving lane is the HOV lane is carried out (step ST83). More specifically, the lane information display unit 41 creates display data for displaying information showing the HOV lane from the lane information delivered from the control unit 30, and delivers to the display control unit 24 in the controller 20. Thus, as shown in FIG. 13, for example, an icon and/or a string indicating that the driving lane is the HOV lane is displayed on the display 17. Incidentally, a configuration of outputting a voice telling that the driving lane is the HOV lane through a voice output system not shown is also possible.

As described above, according to the navigation system of the embodiment 6 in accordance with the present invention, the following advantages are achieved. More specifically, since the HOV lane and ordinary lane are expressed in a single link, the user cannot recognize, from the vehicle position on the map displayed on the screen, the decision of the navigation system as to which lane it travels along. In contrast with this, according to the navigation system of the embodiment 6, since it displays the icon representing the HOV lane or the string "HOV" added to the road number of the current driving road, the user can recognize the decision of the navigation system as to which lane it is traveling along.

INDUSTRIAL APPLICABILITY

A navigation system in accordance with the present invention can carry out route search and route guidance considering an HOV lane. In addition, since it decides the driving lane using the route data obtained by the route search on the assumption that the user is driving along the route, it can increase the degree of matching between the actual driving lane and the driving lane recognized by the navigation system. Accordingly, it can offer consistent operation as the navigation system, and is suitable for applications to a navigation system and the like that guides the user up to a destination considering the HOV lane.

What is claimed is:
1. A navigation system comprising:
a current position detecting unit for detecting a current position;
a direction sensor for detecting presence or absence of a change of direction;
a map data acquiring unit for acquiring map data including road data representing an HOV lane and an ordinary lane in a single link;
a driving link decision unit for identifying a link of driving from current position information indicating the current position detected by the current position detecting unit and from the road data included in the map data acquired by the map data acquiring unit, and for outputting as a driving link; and
a driving lane decision unit for making a decision as to whether a driving lane is an HOV lane or an ordinary lane from the driving link identified by the driving link decision unit based on detection results obtained from the direction sensor.

2. The navigation system according to claim 1, further comprising:
 a destination setting unit for setting a destination; and
 a route search unit for searching for a route to the destination set by the destination setting unit, wherein
 the driving lane decision unit makes a preferential decision of driving in the HOV lane when the route searched for by the route search unit indicates that the route including the driving link identified by the driving link decision unit is a route passing through the HOV lane, and makes a preferential decision of driving in the ordinary lane when the route including the driving link is a route passing through the ordinary lane.

3. The navigation system according to claim 1, further comprising:
 a driving lane storage for successively storing decision results of the driving lane decision unit, wherein
 the driving lane decision unit makes a decision as to whether the driving lane is an HOV lane or an ordinary lane from a preceding driving link stored in the driving lane storage, from presence/absence of a lane change enabled section between the HOV lane and the ordinary lane in the driving link identified by the driving link decision unit, and from the presence or absence of the change of direction detected by the direction sensor.

4. The navigation system according to claim 1, further comprising:
 a driving lane setting unit for setting a driving lane, wherein
 the driving lane decision unit switches the current driving lane to the driving lane set by the driving lane setting unit.

5. The navigation system according to claim 2, wherein
 the route search unit searches for the route to the destination set by the destination setting unit from a starting place on the HOV lane or ordinary lane decided by the driving lane decision unit.

6. A navigation system comprising:
 a current position detecting unit for detecting a current position;
 a map data acquiring unit for acquiring map data including road data representing an HOV lane and an ordinary lane in a single link;
 a driving link decision unit for identifying a link of driving from current position information indicating the current position detected by the current position detecting unit and from the road data included in the map data acquired by the map data acquiring unit, and for outputting as a driving link;
 a driving lane decision unit for making a decision as to whether a driving lane is an HOV lane or an ordinary lane from the driving link identified by the driving link decision unit; and
 a lane information display unit for displaying that the driving lane is the HOV lane when the driving lane decision unit makes a decision of driving in the HOV lane, wherein
 the lane information display unit displays an icon or a string representing that the driving lane is the HOV lane.

7. The navigation system according to claim 1, wherein
 a decision result of the driving lane decision unit is used for at least one of a route search, route guidance and map matching.

8. A navigation system comprising:
 a current position detecting unit for detecting a current position;
 a vehicle speed sensor for detecting a speed;
 a map data acquiring unit for acquiring map data including road data representing an HOV lane and an ordinary lane in a single link;
 a driving link decision unit for identifying a link of driving from current position information indicating the current position detected by the current position detecting unit and from the road data included in the map data acquired by the map data acquiring unit, and for outputting as a driving link; and
 a driving lane decision unit for making a decision as to whether a driving lane is an HOV lane or an ordinary lane from the driving link identified by the driving link decision unit based on detection results obtained from the vehicle speed sensor.

9. The navigation system according to claim 8, wherein
 the driving lane decision unit makes a decision of driving in the HOV lane when the speed detected by the vehicle speed sensor is faster than a prescribed reference value.

10. The navigation system according to claim 8, further comprising:
 a traffic information acquiring unit for acquiring traffic information, wherein
 the driving lane decision unit makes a decision of driving in the HOV lane when the speed detected by the vehicle speed sensor is faster than a reference value decided in accordance with the traffic information acquired by the traffic information acquiring unit.

11. The navigation system according to claim 6, further comprising:
 a destination setting unit for setting a destination; and
 a route search unit for searching for a route to the destination set by the destination setting unit, wherein
 the driving lane decision unit makes a preferential decision of driving in the HOV lane when the route searched for by the route search unit indicates that the route including the driving link identified by the driving link decision unit is a route passing through the HOV lane, and makes a preferential decision of driving in the ordinary lane when the route including the driving link is a route passing through the ordinary lane.

12. The navigation system according to claim 11, wherein
 the route search unit searches for the route to the destination set by the destination setting unit from a starting place on the HOV lane or ordinary lane decided by the driving lane decision unit.

13. The navigation system according to claim 6, further comprising:
 a driving lane setting unit for setting a driving lane, wherein
 the driving lane decision unit switches the current driving lane to the driving lane set by the driving lane setting unit.

14. The navigation system according to claim 6, wherein
 a decision result of the driving lane decision unit is used for at least one of a route search, route guidance and map matching.

15. The navigation system according to claim 8, further comprising:
 a destination setting unit for setting a destination; and
 a route search unit for searching for a route to the destination set by the destination setting unit, wherein
 the driving lane decision unit makes a preferential decision of driving in the HOV lane when the route searched for by the route search unit indicates that the route including the driving link identified by the driving link decision unit is a route passing through the HOV lane, and makes a preferential decision of driving in the ordinary lane when the route including the driving link is a route passing through the ordinary lane.

16. The navigation system according to claim 15, wherein the route search unit searches for the route to the destination set by the destination setting unit from a starting place on the HOV lane or ordinary lane decided by the driving lane decision unit.

17. The navigation system according to claim 8, further comprising:
a driving lane setting unit for setting a driving lane, wherein the driving lane decision unit switches the current driving lane to the driving lane set by the driving lane setting unit.

18. The navigation system according to claim 8, wherein a decision result of the driving lane decision unit is used for at least one of a route search, route guidance and map matching.

* * * * *